US011180379B2

(12) United States Patent
Valkieser

(10) Patent No.: US 11,180,379 B2
(45) Date of Patent: Nov. 23, 2021

(54) GREY WATER TREATMENT SYSTEMS AND METHODS OF TREATING GREY WATER

(71) Applicant: HYDRALOOP INTERNATIONAL B.V., Muiderberg (NL)

(72) Inventor: Arthur J. L Valkieser, Muiderberg (NL)

(73) Assignee: HYDRALOOP INTERNATIONAL B.V., Muiderberg (NL)

( * ) Notice: Subject to any disclaimer, the term of this patent is extended or adjusted under 35 U.S.C. 154(b) by 118 days.

(21) Appl. No.: 16/628,091

(22) PCT Filed: Jul. 3, 2018

(86) PCT No.: PCT/NL2018/050429
§ 371 (c)(1),
(2) Date: Jan. 2, 2020

(87) PCT Pub. No.: WO2019/009709
PCT Pub. Date: Jan. 10, 2019

(65) Prior Publication Data
US 2021/0147251 A1   May 20, 2021

(30) Foreign Application Priority Data
Jul. 4, 2017 (NL) .................................... 2019174

(51) Int. Cl.
*C02F 1/00* (2006.01)
*C02F 103/00* (2006.01)

(52) U.S. Cl.
CPC ............ *C02F 1/001* (2013.01); *C02F 1/006* (2013.01); *C02F 2103/002* (2013.01);
(Continued)

(58) Field of Classification Search
None
See application file for complete search history.

(56) References Cited

U.S. PATENT DOCUMENTS

2008/0314457 A1* 12/2008 Platteel .................. E03B 1/042
137/357

FOREIGN PATENT DOCUMENTS

EP      1943391 A1    7/2008
KR   101710155 B1    2/2017
(Continued)

OTHER PUBLICATIONS

International Search Report and Written Opinion for the International Patent Application No. PCT/NL2018/050429, dated Sep. 20, 2018, 13 pages.
(Continued)

*Primary Examiner* — Richard C Gurtowski
(74) *Attorney, Agent, or Firm* — Kacvinsky Daisak Bluni PLLC

(57) ABSTRACT

A grey water treatment system includes a first tank configured to receive grey water via a grey water supply conduit and that comprises an overflow, a second tank configured to store grey water, and at least one transfer conduit configured to at least transfer grey water between the first tank and the second tank. A control is configured to maintain a water level in said first tank sufficiently close to the overflow to allow floating contaminants to pass over the overflow. A method of treating grey water includes: receiving grey water in a first tank of a grey water treatment system; transferring grey water via at least one transfer conduit between the first tank and a second tank of said treatment system; and controlling a water level in said first tank sufficiently close to an overflow of said first tank to allow floating contaminants to pass over the overflow.

20 Claims, 12 Drawing Sheets

(52) U.S. Cl.
CPC .... *C02F 2201/002* (2013.01); *C02F 2209/03* (2013.01); *C02F 2209/42* (2013.01)

(56) References Cited

FOREIGN PATENT DOCUMENTS

| WO | 2011093700 A1 | 8/2011 |
| WO | 2012118453 A1 | 9/2012 |

OTHER PUBLICATIONS

International Preliminary Report for the International Patent Application No. PCT/NL2018/050429, dated Sep. 27, 2019, 7 pages.

* cited by examiner

GREY WATER TREATMENT SYSTEMS AND METHODS OF TREATING GREY WATER

This is a national stage application filed under 35 U.S.C. § 371 of pending international application PCT/NL2018/050429, filed Jul. 3, 2018, which claims priority to Netherlands Patent application NL 2019174, filed Jul. 4, 2017, the entirety of which applications are hereby incorporated by reference herein.

The present invention relates to a grey water treatment systems and to methods of treating grey water.

European Standard 12056-1 defines greywater as wastewater with a low pollution level and no fecal matter such as produced by showers, baths, hand washbasins and washing machines and that can be used to prepare service water. In contrast, wastewater from the kitchen is not included due to the high levels of fats and food waste it contains.

The British Standard BS8525 defines grey water as domestic wastewater excluding faecal matter and urine.

According to the German Association for Rainwater Harvesting and Water Utilisation, grey water includes water from showers, bathtubs, sinks, kitchen, dishwashers, laundry tubs, and washing machines. It commonly contains soap, shampoo, toothpaste, food scraps, cooking oils, detergents and hair. Greywater makes up the largest proportion of the total wastewater flow from households in terms of volume. Typically, 50-80% of the household wastewater is greywater.

In addition to grey water as defined above, the present invention may also be applied with lightly contaminated water, such as water from a car wash comprising soap residues.

Instead of mains water, which is treated with considerable effort and at a great cost in wastewater purification plants, less clean non-potable grey water can be used for some applications, such as for instance flushing the toilet. It is thus possible to envisage the use of collected greywater. This saving of water furthermore results in a proportional reduction in the stress on the sewage system. The amount of contaminants in grey water may however vary significantly regarding amount and/or type, possibly causing nuisance, such as odor nuisance.

EP-A1-1 943 391 of Applicant is considered the closest prior art, and discloses a grey water system according to the pre-amble of the independent claims. This prior art system comprises a first tank that is configured to receive grey water via a grey water supply conduit. The grey water received in the first tank is transferred from said first tank to a second tank using a transfer conduit, wherein a separating principle is applied that is based on a difference in density or specific weight between the water and contaminants present in said water. Contaminants with a density lower than that of water, such as for instance soap residues, will float and will therefore move to the upper water level in the first tank. On the other hand, relatively heavy contaminants, such as for instance sand residues, with a density which is greater than that of water, will sink and settle at the bottom of the first tank. Because light contaminants will float and heavy contaminants will sink, the cleanest water will be situated substantially in a central part of the first tank. EP-A1-1 943 391 is based on the idea to transfer the relatively clean grey water from the central part of the first tank to a storage tank. Periodically, the system is drained in order to discharge contaminants and to prevent the occurrence of odor nuisance which may occur when the greywater has been stored for too long in the system The amount of contaminants in grey water may vary significantly. In practice, the grey water system of EP-A1-1 943 391 had to be drained regularly. This prior art system discharged contaminants in two ways. First, a purge at the lowest point to remove dirt that is heavier than water and therefore sinks, and secondly temporarily overflow of incoming water to remove floating contaminants. Each discharge of contaminants from the system results in a discharge of grey water, and therefore has a negative effect on the efficiency of the system. After all, first new grey water has to been collected before the grey water system may provide grey water to a water user, such as a toilet. Moreover, the cleaning method of EP-A1-1 943 391 was only active during a limited time. After a supply of grey water, there was some time required for heavy contaminants to sink, and also some contaminants would only gradually float upwards toward the overflow. As soon as the grey water system reached an equilibrium state, treatment of grey water stopped.

KR 101 710 155 discloses a floatation system for treating waste water to thereby preserve the quality of water in public waters. Instead of being directed to the treatment of grey water, it is related to waste water discharged from factories or cities, also known as industrial water and black water, respectively. It refers to the purification or recovery of toxic or harmful substances contained in said wastewater, including oiled wastewater discharged from a steel factory after being used for metal surface treatment, acid/alkali wastewater generated from industrial complexes, and livestock wastewater discharged from farms. If treated water is not clean enough, it may be recirculated from a second tank back to a first tank in a recirculation line that successively comprises a pump, a swing unit, a gas-liquid separator and a micro-bubble generator. A sludge conveying unit that comprises an endless conveyor with brushes pushes floating contaminants away from the surface of the first tank.

International patent application WO-A1-2012/118453 A1 discloses a compact system for processing grey wastewater with the purpose of its reutilization, e.g. for flushing toilet bowls. An intensive biological process for the removal of organic substances existing in wastewater is applied.

Also international patent application WO-A1-2011/093700 is acknowledged as further prior art.

An object of the present invention is to provide a grey water treatment system and a method of treating grey water, that is improved relative to the prior art and wherein at least one of the above stated problems is obviated.

Such objectives as indicated above, and/or other benefits or inventive effects, are attained according to the present disclosure by the assembly of features in the appended independent system claim and in the appended independent method claim.

The grey water treatment system according to the invention, comprises:

a first tank that is configured to receive grey water via a grey water supply conduit and that comprises an overflow;

a second tank that is configured to store grey water; and at least one transfer conduit that is configured to at least transfer grey water between the first tank and the second tank; and a control that is configured to maintain a water level in said first tank sufficiently close to the overflow to allow floating contaminants to pass over the overflow.

Such a control may be embodied in various ways, as elucidated below. None of the prior art documents EP-A1-1

943 391, KR 101 710 155, WO-A1-2012/118453 A1 and WO-A1-2011/093700 disclose such a control.

In the closest prior art EP-A1-1 943 391, through opening of a filling valve air pressure in the second tank will decrease to ambient air pressure. The equilibrium of forces between the air and the water in the second tank is hereby disturbed and water will be transferred from the first tank to the second tank. The water level in the first tank will hereby fall and the water level in the second tank will rise until the water levels in the first and the second tank reach the same level. Thus, in the closest prior art, the control causes the water level in the first tank to lower, and it fails to disclose a control that is configured to maintain a water level in said first tank sufficiently close to the overflow to allow floating contaminants to pass over the overflow.

Also KR 101 710 155, WO-A1-2012/118453 A1 and WO-A1-2011/093700 fail to disclose a control that is configured to maintain a water level in said first tank sufficiently close to the overflow to allow floating contaminants to pass over the overflow. For example, KR 101 710 155 lacks an overflow, and applies a sludge conveying unit that comprises an endless conveyor with brushes that push floating contaminants away from the surface of the first tank.

According to a preferred embodiment, the grey water treatment system further comprises at least one pump that is configured to cause a reciprocation of grey water between the first tank and the second tank. Such a pump may be an embodiment of the control that is configured to maintain a water level in said first tank sufficiently close to the overflow to allow floating contaminants to pass over the overflow. For example, the pump may be configured to pump water from the second tank to the first tank, thereby causing the water level in the first tank to rise. In this way, the water level in the first tank may be maintained sufficiently close to the overflow to allow floating contaminants to pass over the overflow, i.e. over an edge formed by the overflow. In specific embodiments, there may be multiple transfer conduits between the first tank and the second tank, e.g. a first transfer conduit a first transfer conduit that is configured to transfer grey water from the first tank to the second tank, and a second transfer conduit that is configured to transfer grey water from the second tank back to the first tank. In such situation, said control may rise the water level in the first tank if the pump transfers water from the second tank to the first tank at a higher rate than it is able to flow back from the first tank to the second tank.

According to a further preferred embodiment, the second tank is closed and configured to receive a volume of gas above a water level in said second tank, and the control is configured to control said volume of gas to control the water level in said second tank to thereby control the water level in said first tank. This is a further embodiment of the control that is configured to maintain a water level in said first tank sufficiently close to the overflow to allow floating contaminants to pass over the overflow. More specifically, the control is configured to control said volume of gas to selectively push a water level in the second tank downward and transfer grey water from the second tank to the first tank to control the water level in said first tank.

According to a further preferred embodiment, said control is configured to control said at least one pump, and said pump is further configured to provide said volume of gas above the water level in said second tank.

An even further control may be embodied by a controllable mains water supply, that may even rise the water level in the first tank by adding a supply of fresh mains water if the amount of grey water in the grey water treatment system in itself is insufficient to maintain the water level in said first tank sufficiently close to the overflow to allow floating contaminants to pass over the overflow.

According to a further preferred embodiment, the grey water treatment system further comprises a deflector arranged near the overflow, wherein said deflector is configured to deflect floating contaminants towards the overflow. If the first tank comprises a substantially tubular cross section, the deflector is preferably at least partially cone shaped, with the base of said cone facing upwards. The deflector may have the shape of a truncated cone, wherein the grey water supply conduit preferably passes through said deflector and extends from said deflector downward into the first tank.

According to a further aspect, a grey water treatment system according to the invention comprises:
 a first tank that is configured to receive grey water via a grey water supply conduit;
 a second tank that is configured to store grey water;
 a first transfer conduit that is configured to transfer grey water from the first tank to the second tank;
 a second transfer conduit that is configured to transfer grey water from the second tank back to the first tank; and
 at least one pump that is configured to cause a circulation of grey water from the first tank to the second tank and vice versa.

By circulating the of grey water from the first tank to the second tank and vice versa, it is guaranteed that all grey water in the system, i.e. the grey water contained in both the first and the second tank, is over and over again present and treated in the first tank. The grey water in the second tank, that is relatively clean relative to grey water that has just been received in the first tank, is regularly transferred back to the first tank and mixes with grey water in the first tank. In this way, the newly introduced grey water in the first tank is mixed with relatively clean water from the second tank. Moreover, the mixture of newly introduced grey water and grey water that has been transferred back from the second tank is treated in the first tank using the separating principle that is based on a difference in density or specific weight between the water and contaminants present in said water. Since all grey water in the system is re-treated over and over again, there is a significantly reduced need for periodic drainage and overflowing of the tanks of the grey water treatment system. In this way, the efficiency of the grey water treatment system is improved.

The grey water treatment system according to the invention may treat the grey water for any time period required to obtain a desired water quality. Consequently, the quality of the grey water that can be obtained using the grey water treatment system according to the invention is significantly improved relative to prior art grey water systems, such as the grey water system described in EP-A1-1 943 391. Water quality is amongst other measured by the total amount of suspended solids and the turbidity of said water.

According to an even further aspect, a grey water treatment system according to the invention comprises:
 a first tank that is configured to receive grey water via a grey water supply conduit;
 a second tank that is configured to store grey water;
 a first transfer conduit that is configured to at least transfer grey water from the first tank to the second tank; and
 wherein said second tank comprises a treatment device.

Also if the second tank comprises a treatment device, all grey water in the system may be treated over and over again. In the first tank, the grey water is treated using the separating principle that is based on a difference in density or specific weight between the water and contaminants present in said water. The treatment device in the second tank treats the grey water in the second tank. Again, the efficiency of the grey water treatment system is improved, because there is a significantly reduced need for periodic drainage of the tanks of the grey water treatment system.

According to a preferred embodiment, the treatment device comprises the first transfer conduit and is configured to reciprocate grey water between the first tank and the second tank. By reciprocating the grey water between the first tank and the second tank, newly received grey water in the first tank is mixed with relatively clean grey water from the second tank. Moreover, the mixture is exposed in said first tank to the treatment using the separating principle that is based on a difference in density or specific weight between the water and contaminants present in said water.

According to a further preferred embodiment, the grey water treatment system comprises at least one pump that is configured to cause a reciprocation of grey water between the first tank and the second tank.

According to a further preferred embodiment, the treatment device further comprises a second transfer conduit that is configured to transfer grey water from the second tank back to the first tank, and wherein the treatment device is configured to circulate grey water between the first tank and the second tank via the first transfer conduit and the second transfer conduit. Circulating is considered a preferred species of reciprocating, because circulating allows for a more continuous process. Moreover, using a first transfer conduit for transferring grey water from the first tank to the second tank, and a second transfer conduit for transferring grey water from the second tank back to the first tank, allow for a design optimization. On the one hand, in use, the connections of the first and second transfer conduits to the first tank may be vertically offset. On the other hand, in the second tank, an outlet of the first transfer conduit and an inlet of the second transfer conduit may be arranged horizontally offset from each other. Advantages of these preferred designs will be elucidated below in the figure description.

According to an even further preferred embodiment, the at least one pump is an oxygen pump. The oxygen pump is preferably in fluid connection with a nozzle that is arranged near the level where the second transfer conduit debouches into the first tank. Preferably, the nozzle is configured to cause a formation of air bubbles, which has several advantages that will be explained in the figure description.

The invention further relates to a method of treating grey water, comprising the steps of:
  receiving grey water in a first tank of a grey water treatment system;
  transferring grey water via at least one transfer conduit between the first tank and a second tank of said grey water treatment system; and
  controlling a water level in said first tank sufficiently close to an overflow of said first tank to allow floating contaminants to pass over the overflow.

According to a preferred embodiment, the second tank is closed and the step of controlling a water level in said first tank comprises the step of introducing a volume of gas above a water level in said second tank to cause transferring of grey water from the second tank back to the first tank.

According to a further preferred embodiment, the method further comprises the step of deflecting said floating contaminants with a deflector towards the overflow.

The invention may further relate to a method of treating grey water, comprising the steps of:

receiving grey water in a first tank of a grey water treatment system;
transferring grey water via a first transfer conduit from the first tank to a second tank of said grey water treatment system;
transferring grey water from the second tank back to the first tank; and
reciprocating the grey water between the first tank and the second tank.

According to a preferred embodiment, the step of transferring grey water from the second tank back to the first tank comprises transferring said grey water via a second transfer conduit of said grey water treatment system, and said method further comprises the step of circulating the grey water from the first tank to the second tank and vice versa.

The invention may further relate to a method of treating grey water, comprising the steps of:
  receiving grey water in a first tank of a grey water treatment system;
  transferring grey water via a first transfer conduit from the first tank to a second tank of said grey water treatment system; and
  treating said grey water in said second tank.

According to a preferred embodiment, the method further comprises the step of reciprocating the grey water between the first tank and the second tank.

According to a further preferred embodiment, the method further comprises the steps of transferring grey water via a second transfer conduit form the second tank back to the first tank, and circulating the grey water from the first tank to the second tank and vice versa.

Further preferred embodiments are subject of the dependent claims.

The various aspects and features described and shown in the specification can be applied, individually, wherever possible. These individual aspects, and in particular the aspects and features described in the attached dependent claims, may be made subject of divisional patent applications.

In the following description preferred embodiments of the present invention are further elucidated with reference to the drawing, in which.

Figure 1:
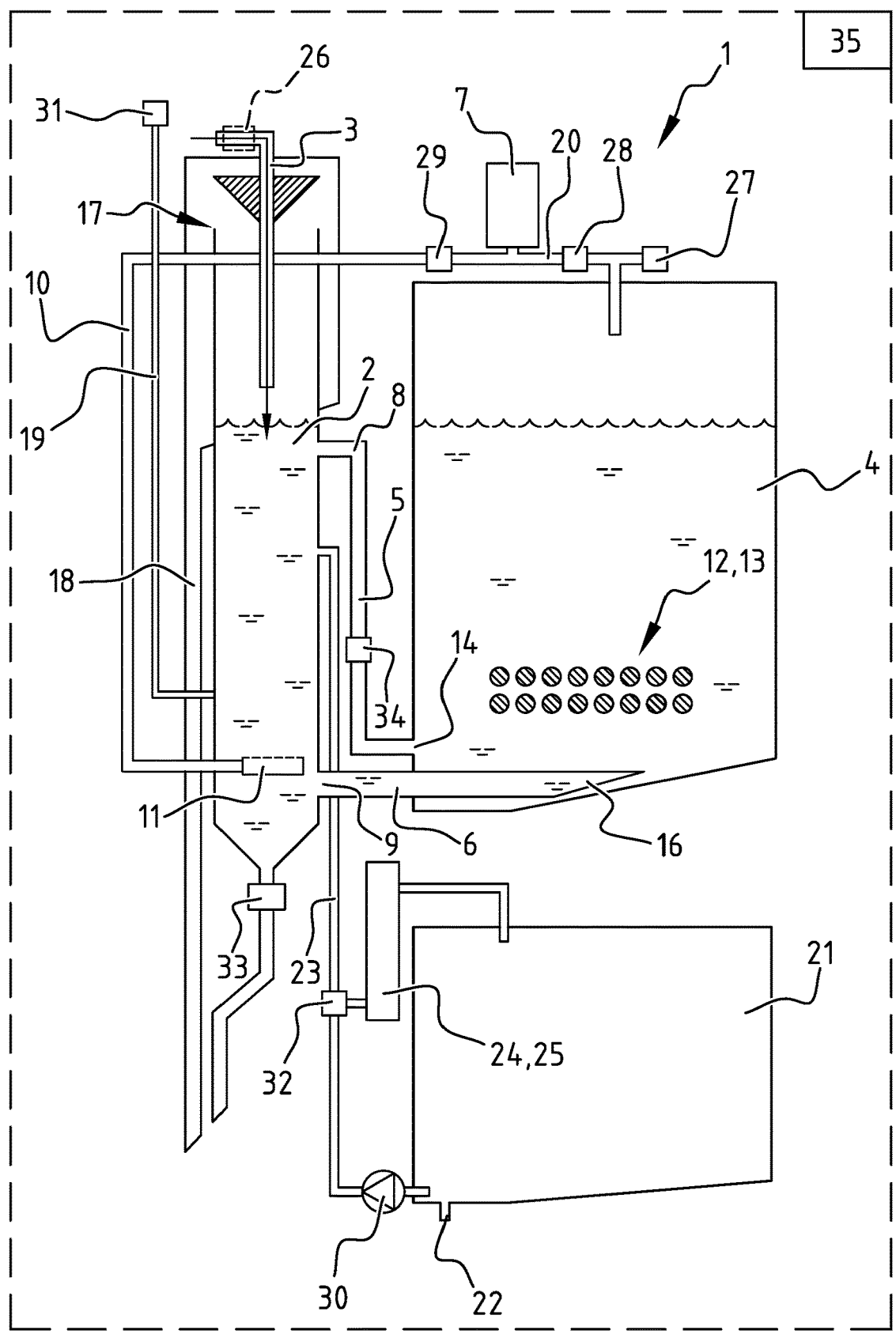
FIGS. 1-6 show schematic views of successive steps of applying a grey water treatment system and method according to the present invention.
Figure 2:
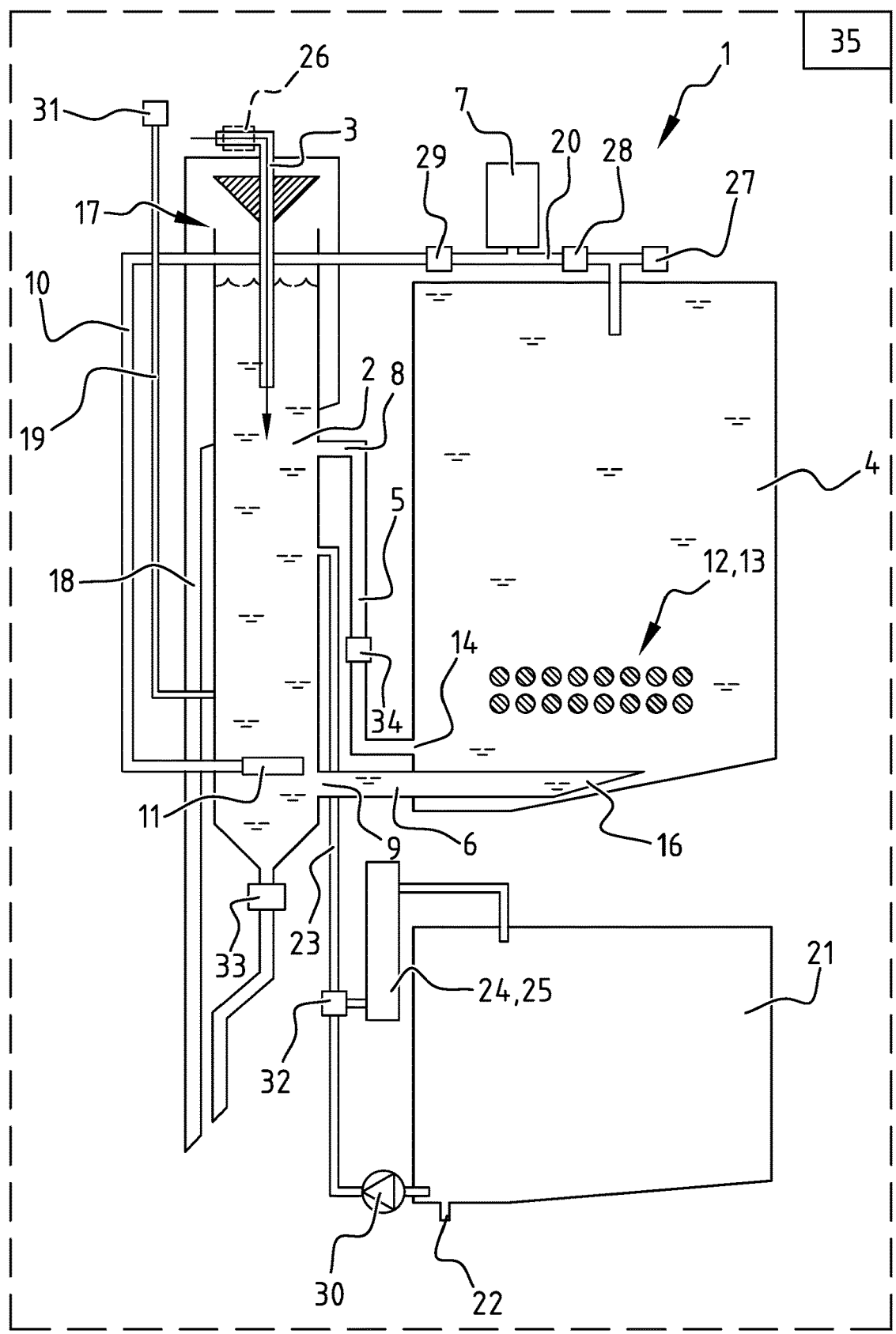

The figures show a grey water treatment system 1, comprising a first tank 2 that is configured to receive grey water via a grey water supply conduit 3 and a second tank 4 that is configured to store grey water. A first transfer conduit 5 is configured to transfer grey water from the first tank 2 to the second tank 4.

In the shown embodiment, and according to a first aspect of the invention, the grey water treatment system 1 comprises a second transfer conduit 6 that is configured to transfer grey water from the second tank 4 back to the first tank 2, and at least one pump 7 that is configured to cause a circulation of grey water from the first tank 2 to the second tank 4 and vice versa.

By circulating the grey water from the first tank 2 to the second tank 4 and vice versa, it is guaranteed that all grey water in the grey water treatment system 1, i.e. the grey water contained in both the first tank 2 and the second tank 4, is over and over again present and treated in the first tank 2. The grey water in the second tank 4, that is relatively clean relative to grey water that has just been received in the first tank 2, is regularly transferred back to the first tank 2 and mixes with grey water in the first tank 2. In this way, the newly introduced grey water in the first tank 2 is mixed with relatively clean water from the second tank 4. Moreover, the mixture of newly introduced grey water and grey water that has been transferred back from the second tank 4 is treated in the first tank 2 using a separating principle that is based on a difference in density or specific weight between the water and contaminants present in said water. Because light contaminants will float ("floatation") and heavy contaminants will sink ("sedimentation)", the cleanest grey water will be situated substantially in a central part of the first tank 2. By arranging the connection of the first transfer conduit 5 at or near this central part with substantially clean grey water, relative clean grey water may be transferred from the first tank 2 to the second tank 4.

Since all grey water in the grey water treatment system 1 is re-treated over and over again, there is a significantly reduced need for periodic drainage of the tanks 2, 4 of the grey water treatment system 1. In this way, the efficiency of the grey water treatment system is improved.

In the shown embodiment, and according to a second aspect of the invention, the first transfer conduit 5 is configured to at least transfer grey water from the first tank 2 to the second tank 4, wherein said second tank 4 comprises a treatment device. The treatment device preferably comprises the first transfer conduit 5 and is configured to reciprocate grey water between the first tank 2 and the second tank 4.

By reciprocating the grey water between the first tank 2 and the second tank 4, newly received grey water in the first tank 2 is mixed with relatively clean grey water from the second tank 4. Moreover, the mixture is exposed in said first tank 2 to a treatment using a separating principle that is based on a difference in density or specific weight between the water and contaminants present in said water.

In the embodiment shown, the grey water treatment system 1 comprises at least one pump 7 that is configured to cause a reciprocation of grey water between the first tank 2 and the second tank 4.

Although the skilled person will understand that a single transfer conduit between the first tank 2 and the second tank 4 is sufficient to reciprocate grey water between the first tank 2 and the second tank 4, the treatment device preferably further comprises the second transfer conduit 6 that is configured to transfer grey water from the second tank 4 back to the first tank 2. Having two transfer conduits 5, 6, the treatment device may be configured to circulate grey water between the first tank 2 and the second tank 4 via the first transfer conduit 5 and the second transfer conduit 6.

In the light of the invention, circulating is considered a species of the genus reciprocating. Circulating is preferred over reciprocating, because circulating allows for a more continuous process.

As mentioned above, the connection of the first transfer conduit 5 to the first tank 2 is preferably arranged at or near a central part of the first tank 2, because this central part will normally accommodate relatively clean grey water. Grey water flows from the first tank 2 via first transfer conduit 5 to the second tank 4. The second transfer conduit 6 is used to transfer grey water from the second tank 4 back to the first tank 2.

The grey water treatment system 1 comprising a first transfer conduit 5 and a second transfer conduit 6 also allows for further design optimizations. Preferably, in use, the connections of the first and second transfer conduits 5, 6 to the first tank 2 are vertically offset. In this way, the connection 9 of the second transfer conduit 6 to the first tank 2 may be arranged at a lower level than the connection 8 of the first transfer conduit 5 to the first tank 2.

The connection 8 of the first transfer conduit 5 to the first tank 2 is an inlet of the first transfer conduit 5, whereas the connection 9 of the second transfer conduit 6 to the first tank 2 is an outlet of the second transfer conduit 6.

According to the preferred embodiment shown in the figures, the grey water treatment system 1 comprises a pump 7 that is preferably used for multiple purposes, as will be explained below. Pump 7 is an oxygen pump that is in fluid connection via a conduit 10 with a nozzle 11. The nozzle 11 is arranged near the level where the second transfer conduit 6 debouches into the first tank 6, i.e. near the connection 9 and outlet of the second transfer conduit 6. Pump 7 may be embodied as a pump that pumps ambient air into the system, as ambient air also contains oxygen.

Figure 4:
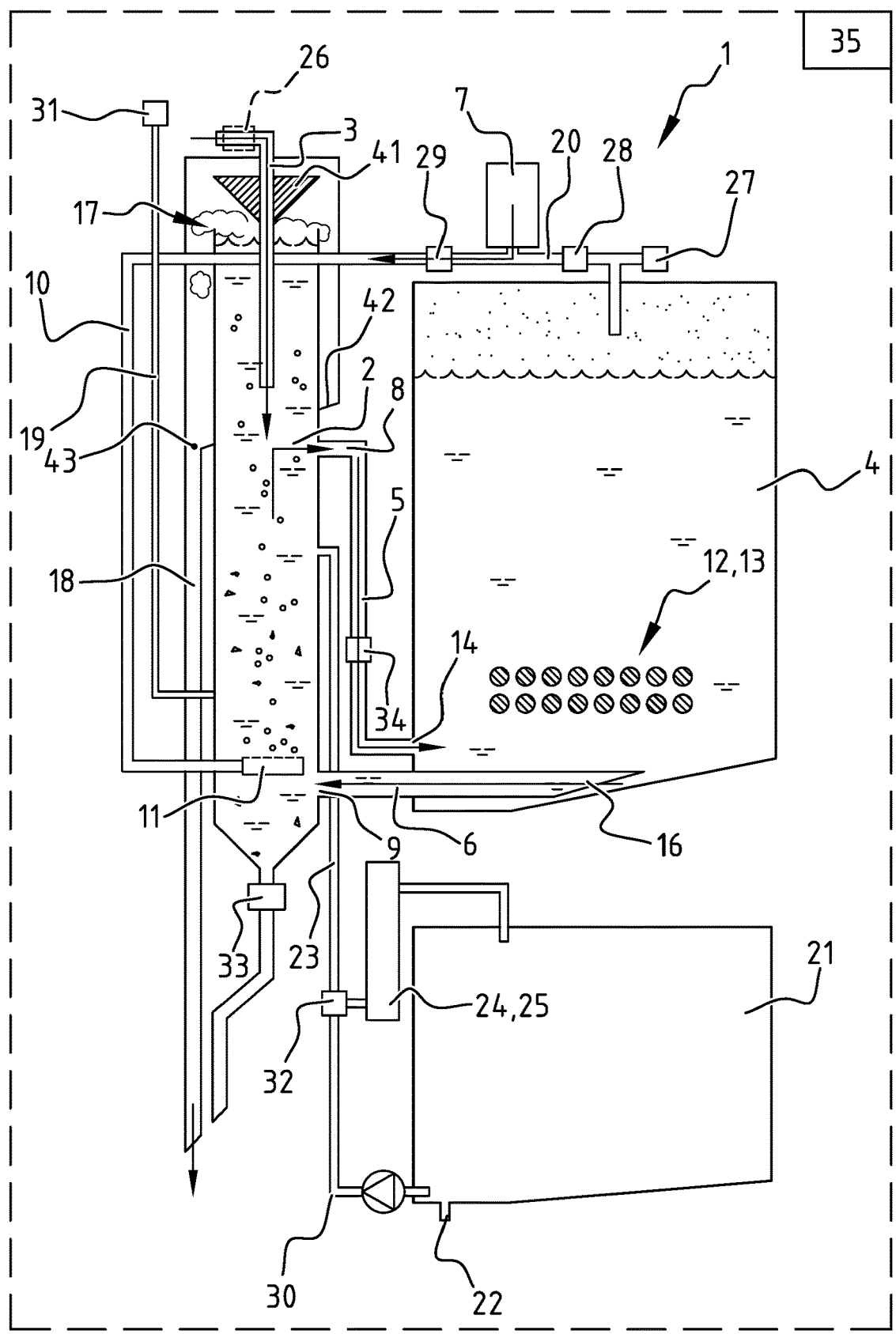
Figure 6:
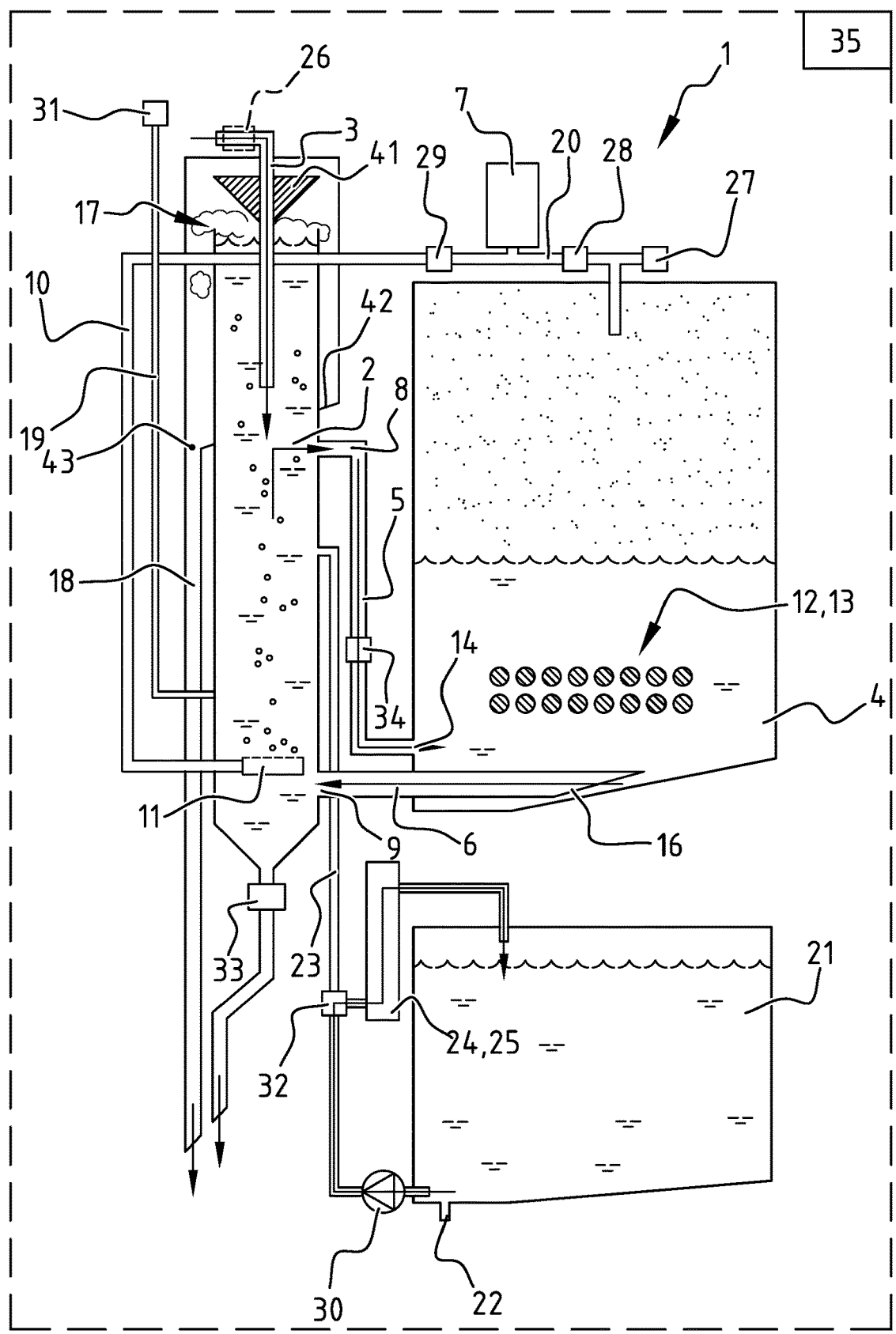

As shown in FIGS. 4 and 6, the nozzle 11 is configured to cause a formation of air bubbles, which has several advantages:

air bubbles may cause an upward flow and consequently cause a transfer from grey water via the first transfer conduit 5 from the first tank 2 to the second tank 4 (FIG. 4);

air bubbles improve the separating principle that is based on a difference in density or specific weight between the water and contaminants present in said water (principles of "floatation" and "sedimentation") in several ways:

air bubbles cause an upward flow;

some contaminants have a tendency to bond to the upward moving air bubbles (principle of "dissolved air flotation");

air bubbles may cause foam formation because grey water commonly contains soap and shampoo (principle of "foam fractionation")—see FIGS. 4 and 6; and air bubbles comprise oxygen and therefore increase an oxygen level of the grey water. The increased oxygen levels promote growth of aerobic bacteria, which are preferred over anaerobic bacteria.

The pump 7 being embodied as an oxygen pump providing the above mentioned synergistic effects results in a very energy efficient grey water treatment system 1. Practical experiments showed that a total power consumption of the grey water treatment system 1 of less than 20 watt per hour can be achieved.

According to an even further preferred embodiment, the treatment device in said second tank 4 comprises a chemical reactor 12, and preferably a bioreactor 13. Such a bioreactor 13 may be based on aerobic bacteria, which are preferred over anaerobic bacteria. By introducing extra oxygen into the grey water using oxygen pump 7, growth of aerobic bacteria is promoted and the efficiency of the bioreactor 13 may be improved. Moreover, the aerobic bacteria will grow and survive at the expense of anaerobic bacteria. As a result, the amount of anaerobic bacteria, which are the main cause of e.g. odor nuisance, is reduced.

In the second tank 4, an outlet 14 of the first conduit 5 and an inlet 16 of the second conduit 6 are horizontally offset from each other. In this way it is guaranteed that all grey water in the second tank 4 is involved in the circulation.

If the outlet 14 of the first conduit 5 and the inlet 16 of the second conduit 5 are remote from each other relative from the chemical reactor 12 or bioreactor 13, the grey water is circulated via said chemical reactor 12 or bioreactor 13. If an oxygen pump 7 is used to cause the circulating flow, air bubbles with oxygen will increase the oxygen level in the grey water that passes through or along the chemical reactor 12 or bioreactor 13. In this way, growth of aerobe bacteria may be promoted.

In order to optimally benefit from the separation principle that is based on a difference in density or specific weight between the water and contaminants present in said water, the first tank 2 is preferably completely filled. The first tank 2 comprises an overflow 17, via which floating contaminants may enter a bypass conduit 18 to be discharged to a (not shown) sewer.

According to the invention, the water level in said first tank 2 is maintained sufficiently close to the overflow 17 to allow floating contaminants to pass over the overflow 17, i.e. over an edge formed by the overflow 17.

Figure 3:
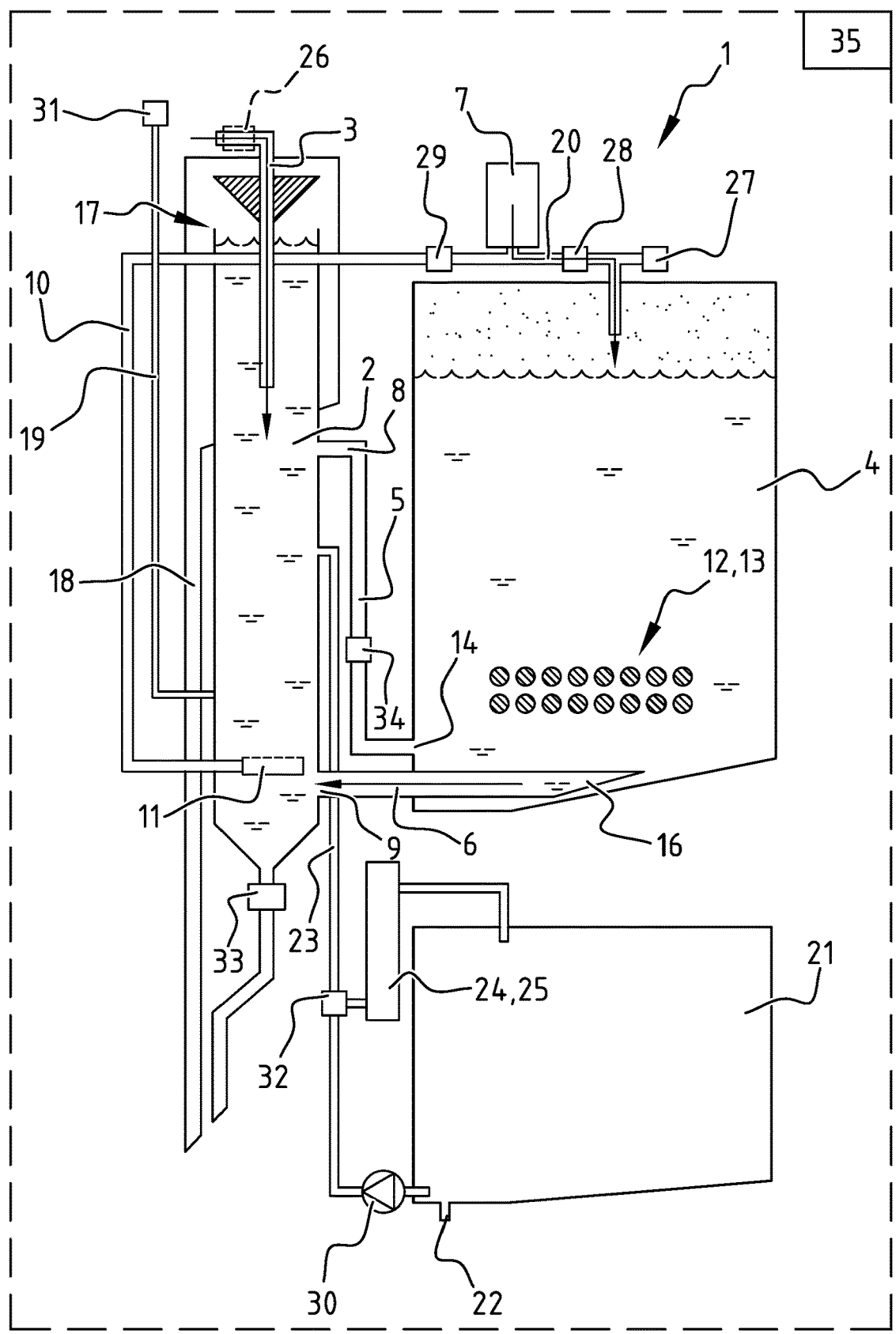

In the shown embodiment, the second tank 4 is closed and configured to receive a volume of gas above a water level in said second tank 4. By introducing a volume of gas above the water level in said second tank 4, the water level is pressed in downward direction and a transferring of grey water from the second tank 4 back to the first tank 2 is caused (FIG. 3). In this way, the water level in the first tank 2 may be raised to a level wherein floating contaminants drift over the edge of the overflow 17. As the water level in the first tank 2 can be accurately controlled, the grey water treatment system 1 may be set to mainly cause foam to drift over the edge of the overflow 17, and spilling of grey water may be reduced to a minimum. The foam (principle of "foam fractionation") also transports floating contaminants (principle of "floatation") over the edge. Moreover, suspended particles that have bonded to the air bubbles (principle of "dissolved air flotation") may be carried along over the edge of the overflow 17, and guided by a sloping bottom 42 towards a discharge location 43, where it enters into the bypass conduit 18 to be discharged to a (not shown) sewer.

Using a pressure sensor 31 and pressure conduit 19, the water level in said first tank 1 may be detected.

Although alternatively a (not shown) further pump may be arranged in connection with said second tank 4, the already present pump 7 is preferably also configured to provide said volume of gas above the water level in said second tank 4. The pump 7 may be connected to the second tank 4 with a further conduit 20.

After treatment of the grey water in first tank 2 and second tank 4 has resulted in grey water that is sufficiently clean, the treated grey water may be stored in a third tank 21. The third tank 21 is configured to store the treated grey water and comprises a discharge 22 for discharging stored treated grey water to a (not shown) water user, such as a toilet. The skilled person will however understand that it is also conceivable that such a third tank 21 is absent, in which case grey water from the first tank 2 and/or second tank 4 is directly transferred to a water user.

Using a third transfer conduit 23 that is also connected to the relatively clean central part of the first tank 2, grey water may be transferred from the first tank 2 to the third tank 21. Preferably, the grey water treatment system 1 further comprises a further treatment device 24 that is configured to at least periodically treat the treated grey water that is stored in the third tank 21 (FIG. 6). A further pump 30 may be used to cause a circulation flow of grey water in the third tank 21 through the further treatment device, which is preferably a UV-filter 25.

Methods of treating grey water according to the invention are now further elucidated using the successive operating steps shown in FIGS. 1-6.

A first step is receiving grey water in the first tank 2 of the grey water treatment system 1. Grey water flowing through the grey water supply conduit 3 may be sensed with a flow sensor 26. Valve 27 is in an open state to allow gas above the water level in the second tank 4 to escape from the closed second tank 2. In this way, the incoming grey water will fill both the first tank 2 and the second tank 2 (FIG. 1).

Once the supply of new grey water has stopped (FIG. 2), valve 27 is closed and valve 28 is opened. Using pump 7, a volume of gas is introduced above the water level in the second tank 4. The water level in the second tank 4 is pressed downwards by the gas, causing a transferring of grey water from the second tank 4 back to the first tank 2 (FIG. 3). Pump 7 introduces gas above the water level in the second tank 4 until the water level in the first tank 2 reaches the overflow 17. In this way, the water level in the second tank 4 is pushed down and the water level in the first tank 2 rises and may be brought sufficiently close to the overflow 17 to allow floating contaminants to pass over the overflow 17. Using a pressure sensor 31 and pressure conduit 19, the water level in said first tank 1 is detected. During the successive process, a control 35 maintains the water level in said first tank sufficiently close to the overflow 17 to allow floating contaminants to pass over the overflow 17.

Valve 28 is now closed and valve 29 opened. Pump 7 is used to pump air with oxygen via conduit 10 to nozzle 11, thereby causing air bubbles to exit the nozzle 11. The air bubbles have several technical effects. FIG. 4 shows how the air bubbles cause an upward flow and consequently cause a transfer from grey water via the first transfer conduit 5 from the first tank 2 to the second tank 4. Valve 27 is still closed, and a circulation will take place. If the water level in first tank 2 drops and this is detected by pressure sensor 31, valve 28 may be opened briefly in order to introduce further gas above the water level in the second tank 4 using pump 7. In this way, the grey water level in the first tank 1 is maintained at or near the overflow 17, i.e. sufficiently close to the overflow 17 to allow floating contaminants to pass over the overflow 17.

The method comprises the step of transferring grey water from the second tank 4 back to the first tank 2 via the second transfer conduit 6, wherein said method further comprises the step of circulating the grey water from the first tank 2 to the second tank 4 and vice versa (FIG. 4). Due to the circulation, the grey water in both the first tank 2 and the second tank 4 periodically passes through the first tank 2, where it is treated on the already discussed separating principle that is based on a difference in density or specific weight between the water and contaminants present in said water.

The method comprises the step of introducing air bubbles into the first tank 2 (FIG. 4), wherein the air bubbles cause one or more of:
  the transferring of grey water via the first transfer conduit 5 from the first tank 2 to the second tank 4;
  the formation of foam in the grey water; and
  an increase in an oxygen level of the grey water.

This separating principle is also improved by the upward flow caused by the air bubbles on the one hand, and the tendency of some contaminants to bond to the upward moving air bubbles on the other hand. Moreover, the air bubbles may cause foam formation because grey water commonly contains soap and shampoo (FIGS. 4 and 6).

In the shown embodiment, a deflector 41 is arranged near the overflow, wherein said deflector 41 is configured to deflect floating contaminants towards the overflow 17. In this way, the deflector 41 facilitates floating contaminants passing over the overflow 17, i.e. over the edge formed by the overflow 17.

If the first tank 2 comprises a substantially tubular cross section, the deflector 41 is preferably at least partially cone shaped or funnel shaped, with the base of said cone facing upwards. In this way, the deflector 41 may be arranged at a constant distance from the overflow 17 along the circumference thereof. The skilled person will understand that for an overflow 17 having a different shape, another shape of the deflector 41 may be more appropriate. For example, an optimal deflector in combination with a square shaped circumference of the overflow may comprise a substantially pyramid shape.

In the shown preferred embodiment, the deflector 41 has the shape of a truncated cone, wherein the grey water supply conduit 3 passes substantially centrally through a central opening 44 of said deflector 41, and extends from said deflector 41 downward into the first tank 2. An extension of the grey water supply conduit 3 from the deflector into the first tank 2 reduces the change of floating contaminants or foam entering the grey water supply conduit 3.

According to the invention, the control 35 maintains the water level in said first tank 2 sufficiently close to the overflow 17 to allow floating contaminants to pass over the overflow 17, i.e. over an edge formed by the overflow 17. More in particular, floating contaminants will rise in the first tank 2 and will be deflected by deflector 41 towards the overflow 17 (FIGS. 4 and 6).

The skilled person will choose a distance d between the overflow 17 and the deflector 41 that is on the one hand close enough to allow the deflector 41 to deflect floating contaminants and especially foam, whereas on the other hand the distance d is sufficiently large to allow foam to easily pass over the overflow 17. A distance d between the overflow 17 and the deflector 41 in the range of 0.5-2 cm, preferably about 1 cm, has been proven effective during tests.

Once floating contaminants and foam, as well as occasionally some grey water, pass over the overflow 17, it is guided by a sloping bottom 42 towards a discharge location 43 that is arranged at or near a lowest point of said sloping bottom. 42. From this discharge location 43, the floating contaminants and foam enter bypass conduit 18 to be discharged to a (not shown) sewer.

The air bubbles also comprise oxygen and therefore increase an oxygen level of the grey water. The increased oxygen level promotes growth of aerobic bacteria, which are preferred over anaerobic bacteria.

The method may also comprise the step of treating said grey water in said second tank 4 with a chemical reactor 12, preferably a bioreactor 13. The effectiveness of such a bioreactor 13 may also be improved due to the increased oxygen level.

Figure 5:
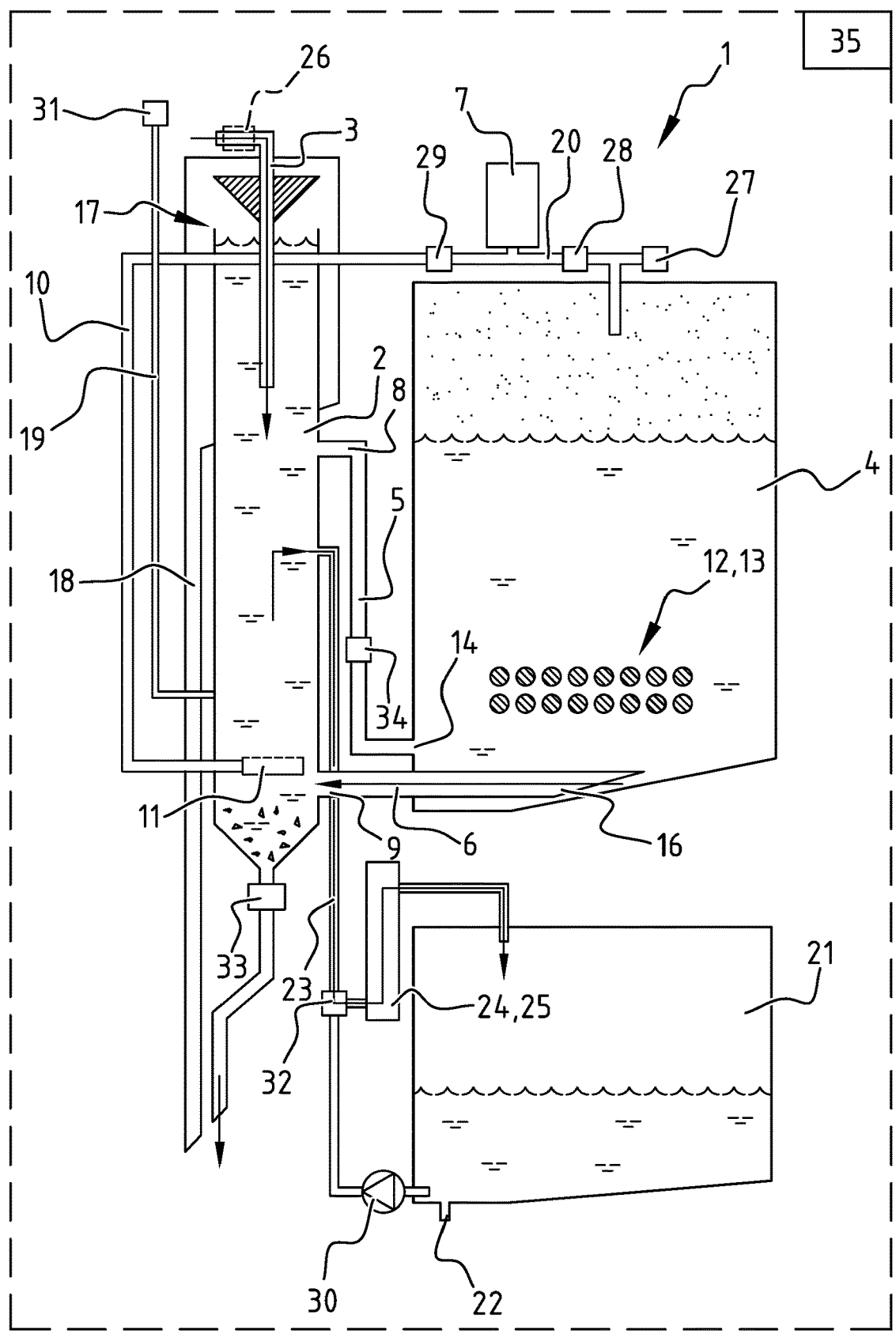

The treatment in first tank 2 and second tank 4 is continued for a set amount of time that is sufficient to reach the desired water quality. After treatment of the grey water in first tank 2 and second tank 4 has resulted in grey water that is sufficiently clean, the treated grey water may be stored in a third tank 21 (FIG. 5). The method thus may comprise the step of storing treated grey water in the third tank 21 of said grey water treatment system 1 (FIG. 5). Preferably, the water is transferred from the first tank 2 to the third tank 21 via the further treatment device 24, which is preferably a UV-filter 25 with a UV-light source. Third transfer conduit 23 is connected to the three-way valve 32, that directs the water from first tank 2 via the further treatment device 24. During transfer of treated grey water from the first tank 2 to the third tank 21, the optional valve 34 in the first transfer conduit 5 is preferably closed.

The method preferably also comprises the further step of periodically treating the treated grey water that is stored in said third tank 21, which may take place simultaneously with other grey water treatment processes in the first tank 2 and second tank 4 if the flows are separated (FIG. 6).

FIGS. 7-10 show embodiments of a flow sensor 26 of the grey water treatment system 1. Said flow sensor 26 comprises at least one pressure sensor that is configured to measure a pressure difference between a first measurement location 38 and a second measurement location 39. The measurement locations 38 and 39 are arranged vertically offset relative to each other inside said grey water supply conduit 3. In operation, the flow sensor 26 measures a pressure difference between the first measurement location 38 and the second measurement location 39, which are arranged vertically offset relative to each other inside said grey water supply conduit 3. Preferably, said flow sensor 26 is arranged near a lowered portion 37 of said grey water supply conduit 3. Said lowered portion 37 may comprise a U- or V-shaped bend. The U-shaped bend shown in FIGS. 7 and 8 may function as a siphon, and provide an odor lock.

Although a single pressure sensor may measure a pressure difference between the first measurement location 38 and the second measurement location 39, improved accuracy may be obtained if the flow sensor 26 comprises a first pressure sensor and a second pressure sensor that are arranged vertically offset relative to each other in said grey water supply conduit. Each pressure sensor measures the pressure at a respective measurement location 38, 39.

Figure 7:
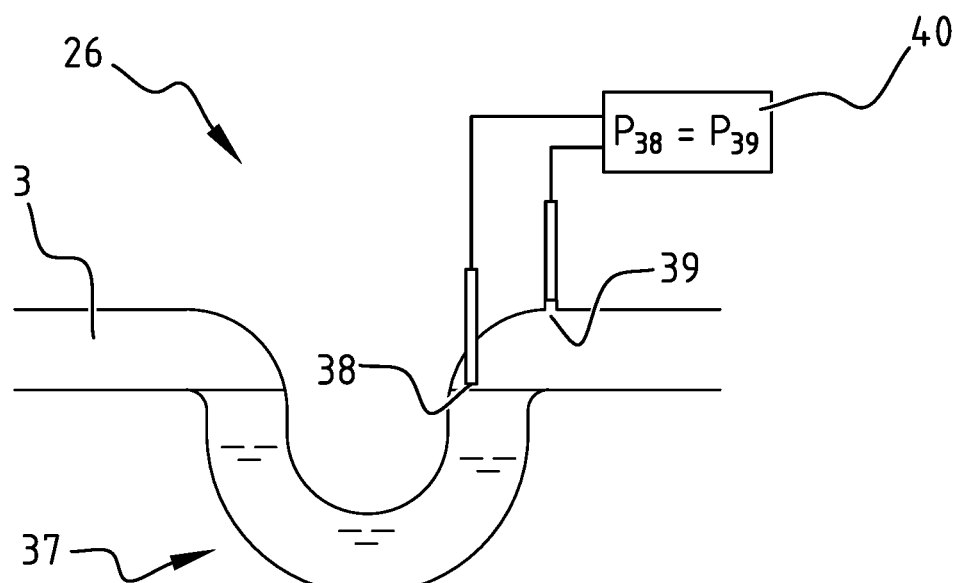
FIGS. 7 and 8 show schematic views of a water supply sensor in two successive steps.

FIG. 7 shows a rest state, wherein there is no supply of grey water through said grey water supply conduit 3. Both the first measurement location 38 and the second measurement location 39 of the flow sensor 26 are arranged above the water level in lowered portion 37 of the the grey water supply conduit 3. Consequently, the same ambient air pressure is measured at both measurement locations 38, 39. Thus, $p_{38}=p_{39}$ in the rest state.

Figure 8:
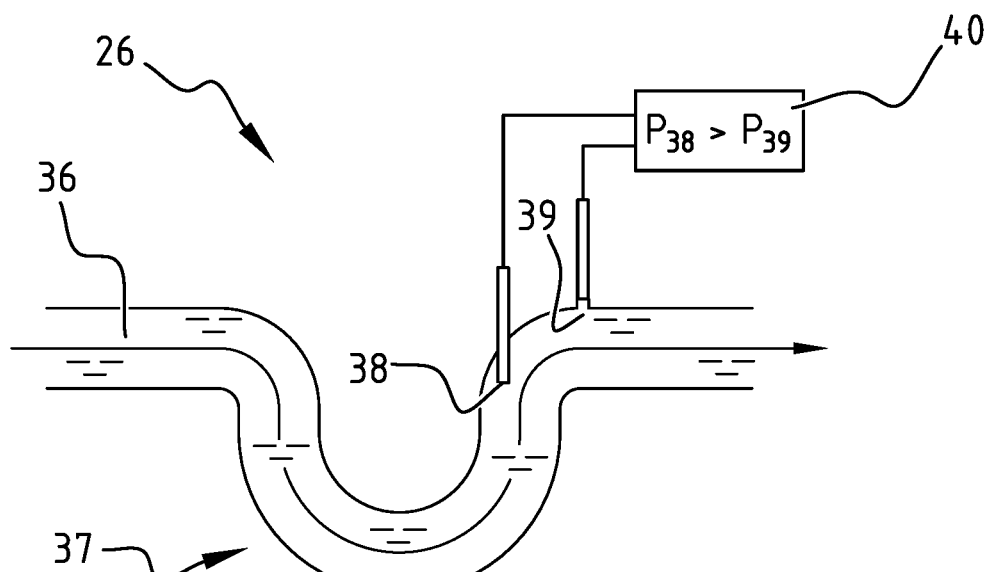

In FIG. 8, there is a supply of grey water via grey water supply conduit 3. Since the first measurement location 38 is vertically arranged at a lower level than the second measurement location 39, the pressure measured at the first measurement location 38 is higher than the pressure measured at the second measurement location 39. Thus, $p_{38}>p_{39}$ during supply of grey water through grey water supply conduit 3.

A pressure sensor/controller 40 of flow sensor 26 monitors the pressure difference between the pressure levels measured at both measurement locations 38, 39. Controller 40 of flow sensor 26 may communicate with a control 35 of the grey water treatment system 1.

The flow sensor 26 as described above is particularly suitable for detecting a grey water supply, as it is insensitive for the contaminants present in grey water. Contrary to conventional flow sensors, the flow sensor 26 is not susceptible for clogging.

Figure 9:
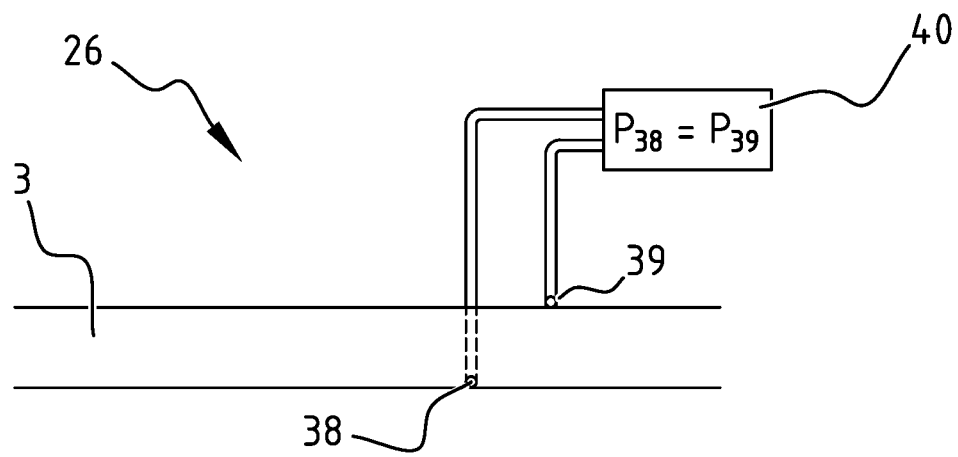
FIGS. 9 and 10 show schematic views of a water supply sensor in two successive steps according to an alternative embodiment.
Figure 10:
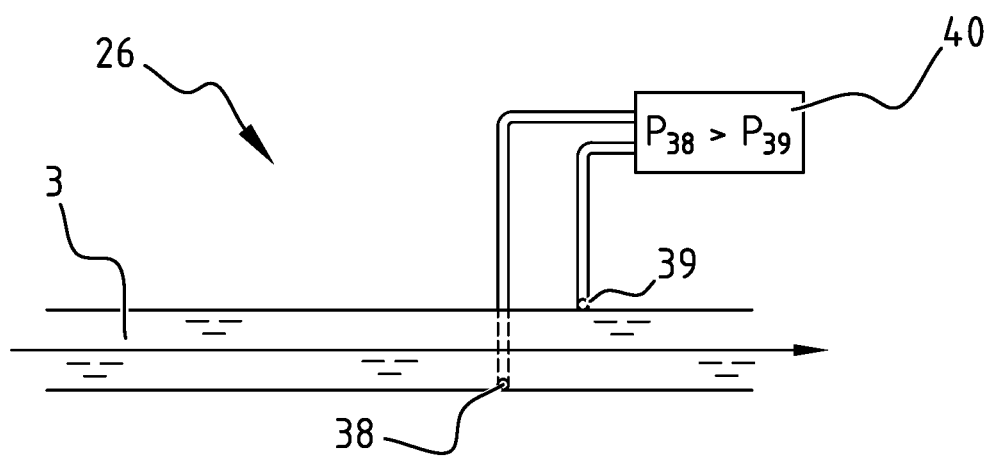

The skilled person will understand that a flow sensor 26 with two vertically offset measurement locations may also be arranged in a substantially straight grey water supply conduit 3 (FIGS. 9 and 10). The working principle is identical to the embodiment in FIGS. 8 and 9.

According to another (not shown) embodiment, the flow sensor 26 is embodied as FIG. 8, with the difference that the measurement locations 38 and 39 would be located upstream of the bend. Basically, this would be FIG. 8 with an inverse flow direction. In that case, the flow of grey water will result in an under pressure at the measurement locations 38, 39. The difference in (under) pressure is again an indication for a flow of grey water. However, due to this under pressure, the flow sensor 26 will be less susceptible for clogging than in the embodiment of FIGS. 7, 8. After all, an under pressure would draw particles present in the grey water away from the measurement locations 38, 39, instead of pressing these particles into the measurement locations 38, 39.

It is noted that a flow sensor 26, comprising at least one pressure sensor that is configured to measure a pressure difference between a first measurement location 38 and a second measurement location 39, which are arranged vertically offset relative to each other inside a conduit, is not necessarily limited to being applied in conjunction with a grey water treatment system according to they invention. Such a flow sensor 26 may find application in various conduits wherein the presence of a flow is to be monitored.

The different aspects as defined by the independent claims may be applied in combination or independent from each other. For example, the control 35 that is configured to maintain a water level in said first tank 2 sufficiently close to the overflow 17 to allow floating contaminants to pass over the overflow 17, may be embodied in various ways as described above. For example, the control 35 may control the pump 7 to control a volume of gas above a water level in said second tank 4, to thereby selectively push the water level in the second tank 4 downward and transfer grey water from the second tank 4 to the first tank 2 to control the water level in said first tank 2. Alternatively, the control 35 may be embodied as a (not shown) pump that is configured to pump water from the second tank 4 to the first tank 2, thereby causing the water level in the first tank 2 to rise. Also, the control 35 may control a supply of mains water via a (not shown) mains water supply. The skilled person will understand that the control 35 may be embodied as a combination of two or more of the above mentioned ways to maintain the water level in said first tank 2 sufficiently close to the overflow 17 to allow floating contaminants to pass over the overflow 17.

Figure 11:
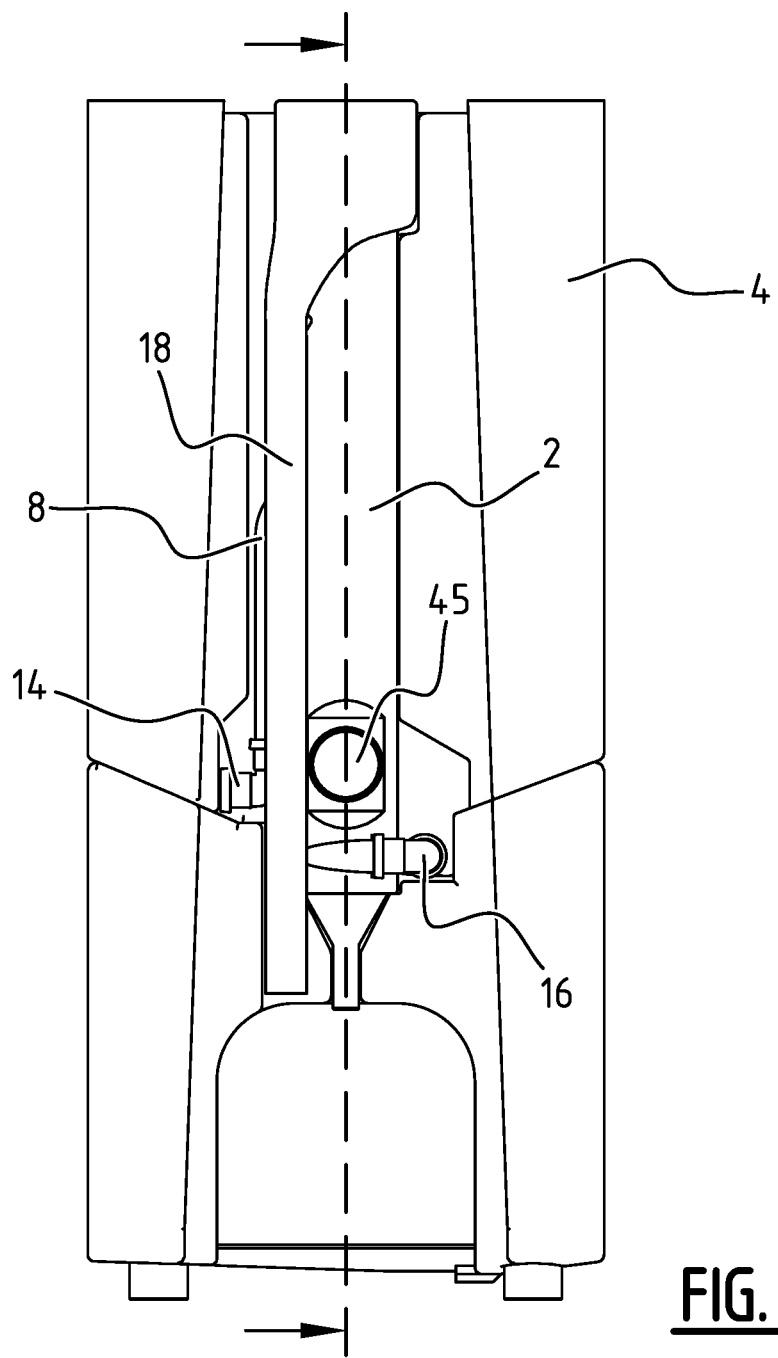
FIGS. 11-13 show a frontal, top and side view of a grey water system 1 according to the invention.
Figure 12:
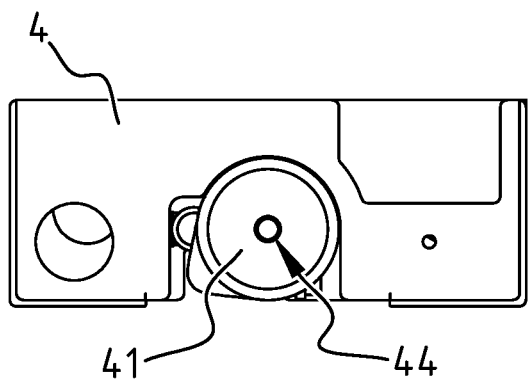
Figure 13:
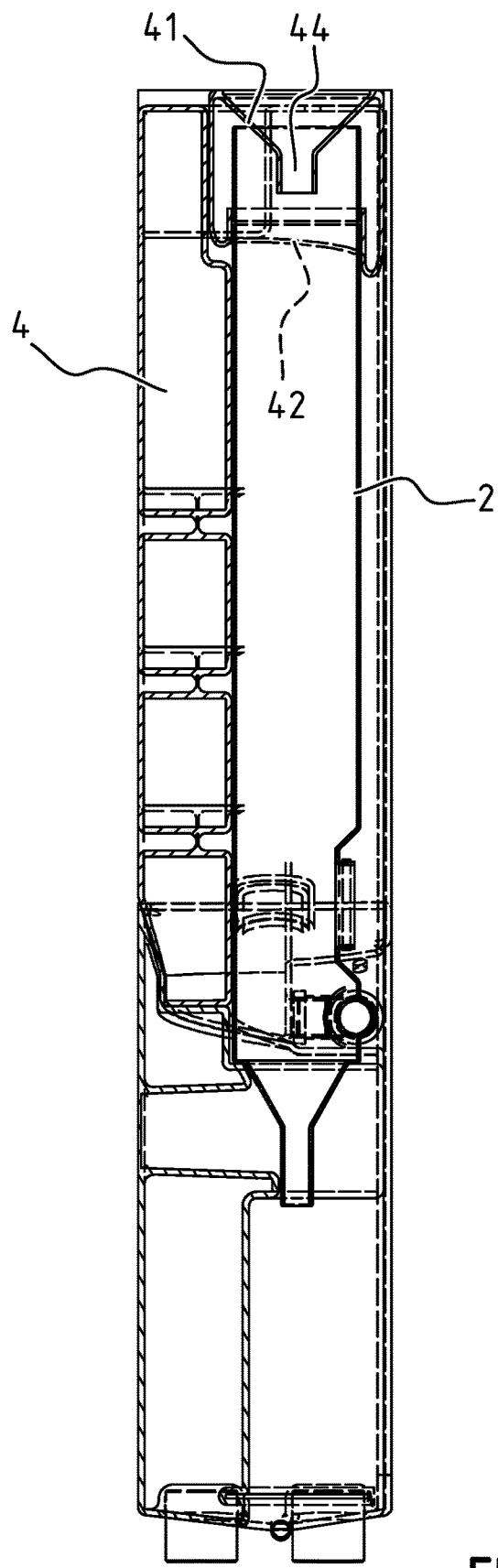

Whereas FIGS. 1-6 show schematic layouts of a grey water system 1 according to the invention, FIGS. 11-13 show a frontal, top and side view of a preferred practical embodiment of the grey water system 1. In this practical embodiment, the first tank 2 is arranged substantially centrally relative to the second tank 4, which is advantageous for obtaining optimal circulation and improved cleaning options. If the second tank 4 partly surrounds the first tank 2, it is possible to arrange outlet 14 of the first conduit 5 and an inlet 16 of the second conduit 6 horizontally offset from each other with relative short conduits that extend in different direction, e.g. opposite directions, relative from the first tank 2. The horizontal offset guarantees that all grey water in the second tank 4 is involved in the circulation.

Figure 14:
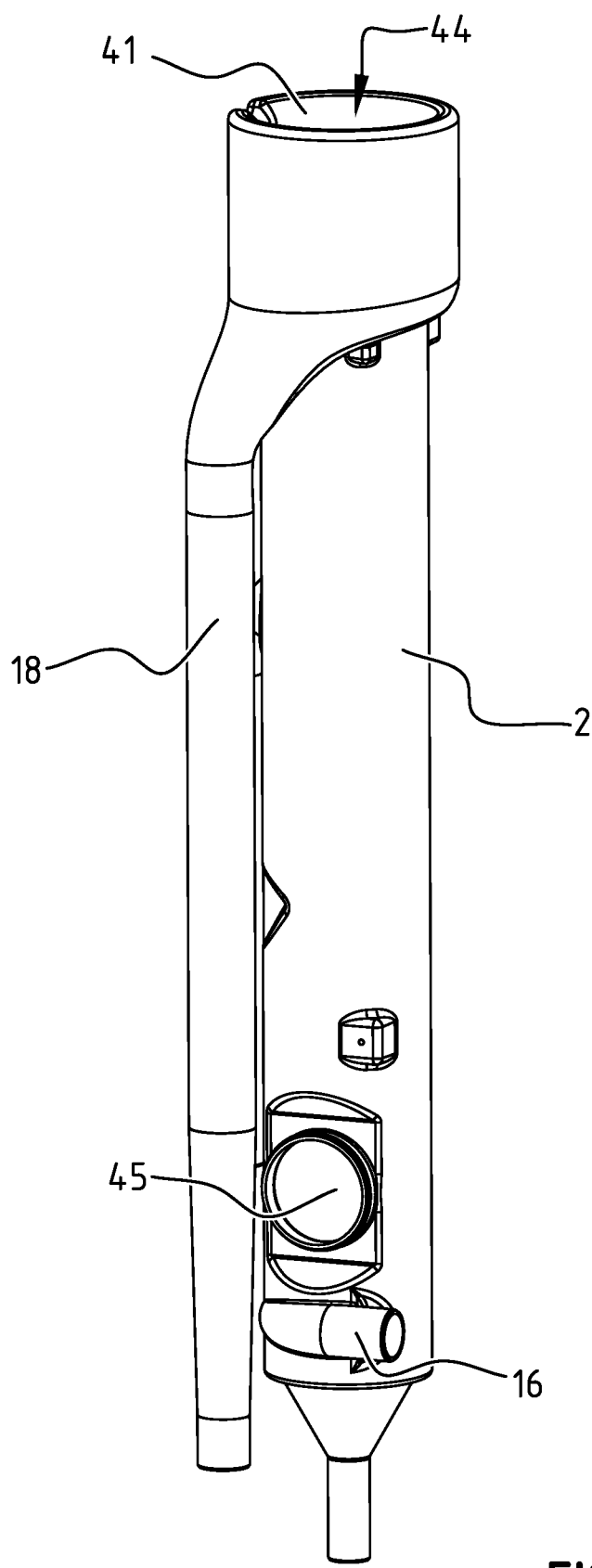
FIGS. 14 and 15 show a component embodying a deflector and bypass conduit.
Figure 15:
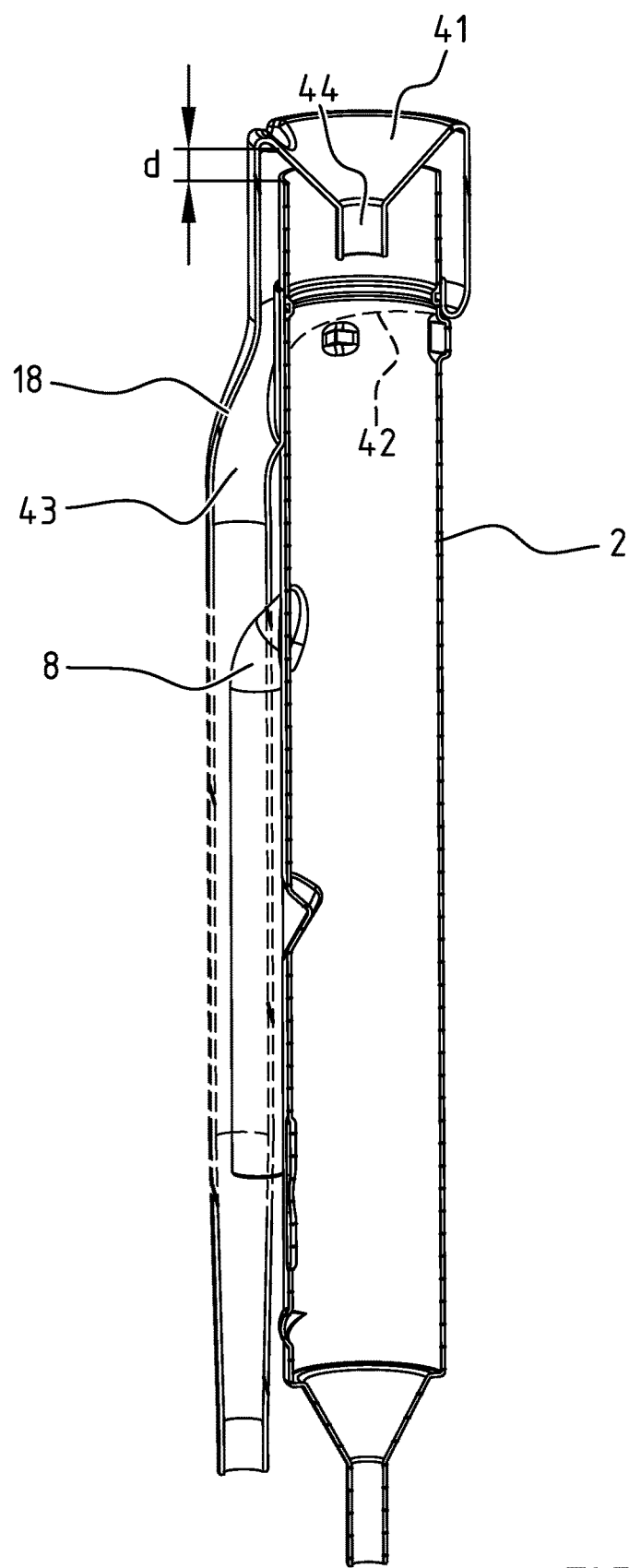

FIGS. 14 and 15 show an integral component embodying a deflector 41 and a bypass conduit 18.

The above described embodiment is intended only to illustrate the invention and not to limit in any way the scope of the invention. For example, the schematic figures show separate tanks. The skilled person will however understand that said tanks may be chambers, i.e. sub-tanks in a larger tank.

It should be understood that where features mentioned in the appended claims are followed by reference signs, such signs are included solely for the purpose of enhancing the intelligibility of the claims and are in no way limiting on the scope of the claims. The scope of the invention is defined solely by the following claims.

The invention claimed is:

1. A grey water treatment system, comprising:
   a first tank configured to receive grey water via a grey water supply conduit and that comprises an overflow via which floating contaminants are dischargeable to a sewer;
   a second tank configured to store grey water;
   wherein the second tank is closed and configured to receive a gas above a water level in said second tank; and
   at least one transfer conduit configured to at least transfer grey water between the first tank and the second tank;
   the system further comprising:
   at least one pump configured to introduce said gas above the water level in said second tank; and
   a control configured to control said at least one pump to introduce said gas above the water level in said second tank to control the water level in said second tank by selectively pressing said water level downwards by the introduced gas to transfer water from the second tank to the first tank, thereby causing a water level in the first tank to rise and maintain said water level in said first tank sufficiently close to the overflow to allow floating contaminants to pass over the overflow.

2. The grey water treatment system according to claim 1, wherein the at least one pump is configured to cause a reciprocation of grey water between the first tank and the second tank.

3. The grey water treatment system according to claim 1, further comprising a deflector arranged at the overflow, wherein said deflector is configured to deflect floating contaminants towards the overflow.

4. The grey water treatment system according to claim 1, comprising:
   a first transfer conduit configured to transfer grey water from the first tank to the second tank; and
   a second transfer conduit configured to transfer grey water from the second tank back to the first tank.

5. The grey water treatment system according to claim 1, wherein said at least one pump is configured to cause a circulation of grey water from the first tank to the second tank and vice versa.

6. The grey water treatment system according to claim 4, wherein:
   connections of the first and second transfer conduits to the first tank are vertically offset; and
   a connection of the second transfer conduit to the first tank is arranged at a lower level than the connection of the first transfer conduit to the first tank.

7. The grey water treatment system according to claim 1, wherein the at least one pump is an oxygen pump.

8. The grey water treatment system according to claim 7, wherein the oxygen pump is in fluid connection with a nozzle that is arranged at a level where a second transfer conduit debouches into the first tank to allow the oxygen pump to be further used to cause, via said nozzle, a formation of air bubbles in the first tank.

9. The grey water treatment system according to claim 1, wherein the second tank comprises a treatment device.

10. The grey water treatment system according to claim 4, wherein, in the second tank, an outlet of the first transfer conduit and an inlet of the second transfer conduit are horizontally offset from each other.

11. The grey water treatment system according to claim 10, wherein the outlet of the first transfer conduit and the inlet of the second transfer conduit are remote from each other relative from a treatment device.

12. The grey water treatment system according to claim 1, further comprising a third tank connected to the first tank via a third transfer conduit, wherein said third tank is configured to store treated grey water and that comprises a discharge for discharging stored treated grey water to a water user.

13. The grey water treatment system according to claim 12, further comprising a further treatment device configured to at least periodically treat the treated grey water that is stored in the third tank.

14. The grey water treatment system according to claim 1, further comprising a flow sensor, comprising at least one pressure sensor that is configured to measure a pressure difference between a first measurement location and a second measurement location, which are arranged vertically offset relative to each other inside said grey water supply conduit; said flow sensor is arranged at a lowered portion of said grey water supply conduit, wherein said lowered portion comprises a U- or V-shapedbend; and wherein the system further comprises a first pressure sensor and a second pressure sensor that are arranged vertically offset relative to each other in said grey water supply conduit.

15. A method of treating grey water with a grey water treatment system according to claim 1, comprising:
receiving grey water in a first tank of a grey water treatment system; and
transferring grey water via at least one transfer conduit between the first tank and a second tank of said grey water treatment system;
wherein the second tank is closed and configured to receive a volume of gas above a water level in said second tank;
by the method further comprising:
controlling a water level in said first tank by pumping a volume of gas above a water level in said second tank, thereby pressing the water level in the second tank downwards and causing a transferring of grey water from the second tank back to the first tank, thereby causing a water level in the first tank to rise sufficiently close to an overflow of said first tank to allow floating contaminants to pass over the overflow.

16. The method according to claim 15, wherein the step of transferring grey water from the second tank back to the first tank comprises transferring said grey water via a second transfer conduit of said grey water treatment system, and wherein said method further comprises the step of circulating the grey water from the first tank to the second tank and vice versa.

17. The method according to claim 15, comprising:
transferring grey water via a first transfer conduit from the first tank to the second tank;
transferring grey water via a second transfer conduit from the second tank back to the first tank; and
circulating the grey water from the first tank to the second tank and vice versa.

18. The method according to claim 15, further comprising introducing air bubbles into the first tank to cause the transferring of grey water via the first transfer conduit from the first tank to the second tank as a step of circulating the grey water from the first tank to the second tank and vice versa.

19. The method according to claim 15, comprising the step of introducing air bubbles into the first tank to cause at least one of:
the formation of foam in the grey water; and
an increase in an oxygen level of the grey water by the air bubbles, wherein the air bubbles include oxygen.

20. The method according to claim 15, further comprising measuring a pressure difference between a first measurement location and a second measurement location, which are arranged vertically offset relative to each other inside said grey water supply conduit.

* * * * *